United States Patent
Comisky et al.

(10) Patent No.: US 6,574,683 B1
(45) Date of Patent: Jun. 3, 2003

(54) EXTERNAL DIRECT MEMORY ACCESS PROCESSOR IMPLEMENTATION THAT INCLUDES A PLURALITY OF PRIORITY LEVELS STORED IN REQUEST QUEUE

(75) Inventors: David A. Comisky, Plano, TX (US); Iain Robertson, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 460 days.

(21) Appl. No.: 09/603,343

(22) Filed: Jun. 26, 2000

Related U.S. Application Data

(60) Provisional application No. 60/162,341, filed on Oct. 29, 1999, and provisional application No. 60/144,572, filed on Jul. 15, 1999.

(51) Int. Cl.[7] .................... G06F 13/00; G06F 9/00
(52) U.S. Cl. ................. 710/23; 710/5; 710/22; 710/24; 710/25
(58) Field of Search ............... 710/22, 23, 25, 710/5, 24

(56) References Cited

U.S. PATENT DOCUMENTS

| | | | | |
|---|---|---|---|---|
| 5,634,076 A | * | 5/1997 | Garde et al. | 710/22 |
| 5,669,013 A | * | 9/1997 | Watanabe et al. | 710/5 |
| 5,826,106 A | * | 10/1998 | Pang | 710/25 |
| 5,944,800 A | * | 8/1999 | Mattheis et al. | 710/23 |
| 6,240,458 B1 | * | 5/2001 | Gilbertson | 709/232 |
| 6,253,260 B1 | * | 6/2001 | Beardsley et al. | 710/5 |
| 6,370,601 B1 | * | 4/2002 | Baxter | 710/65 |
| 6,473,780 B1 | * | 10/2002 | Barcelo | 709/103 |

* cited by examiner

Primary Examiner—Jeffrey Gaffin
Assistant Examiner—Tammara Peyton
(74) Attorney, Agent, or Firm—Robert D. Marshall, Jr.; W. James Brady, III; Frederick J. Telecky, Jr.

(57) ABSTRACT

An external direct memory access unit includes an event recognizer storing plural event types in an event register, a priority encoder selecting for service one recognized external event, a parameter memory storing service request parameters corresponding to each event type and an external direct memory access controller recalling service request parameters from the parameter memory corresponding to recognized events and submitting them to a centralized direct memory access unit. The external direct memory access controller may update source or destination address for a next occurrence of an event type by adding an offset or updating an address pointer to a linked list. The centralized direct memory access unit queues data transfer parameters on a priority channel basis and stalls the external direct memory access controller for a particular priority level it the corresponding queue is full. The use of a report word or an alternate report word signals the centralized direct memory access unit to prohibit or permit interruption of an executing data transfer. An event mask permits selective masking of event types. A central processing unit may trigger an external event by writing to a corresponding bit in the event register.

18 Claims, 7 Drawing Sheets

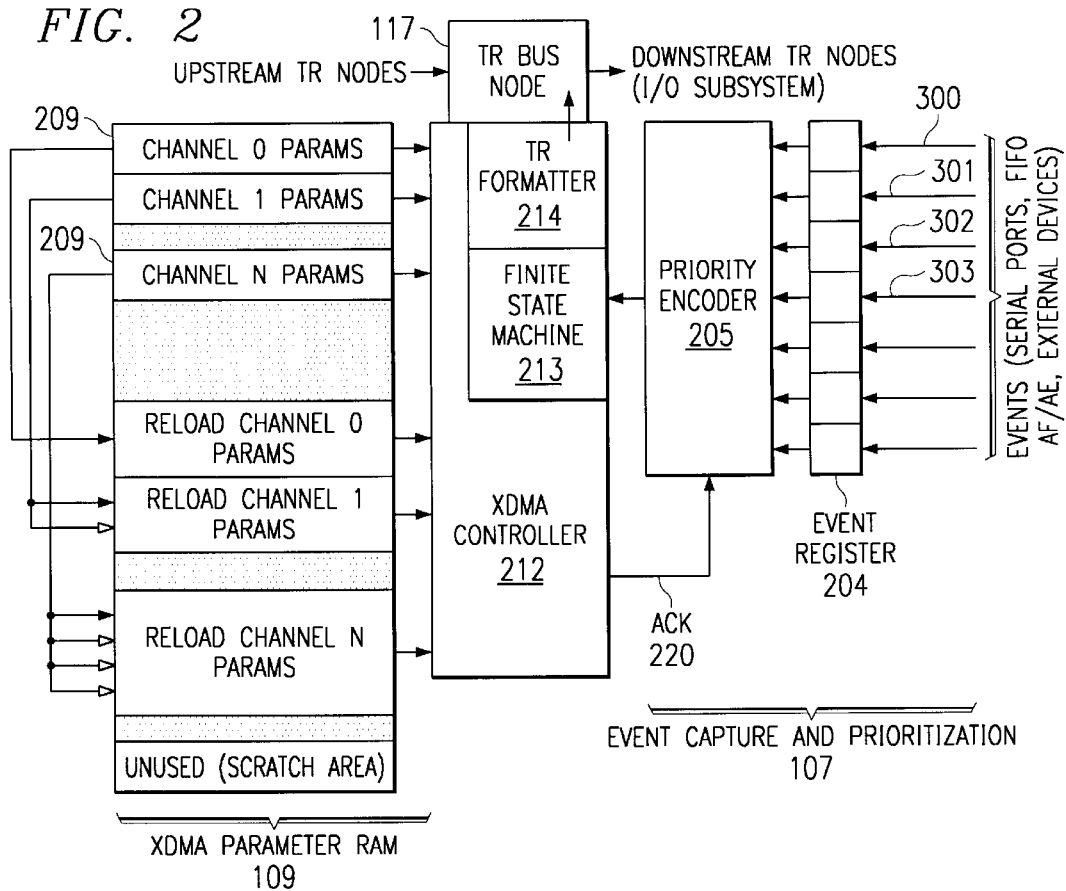
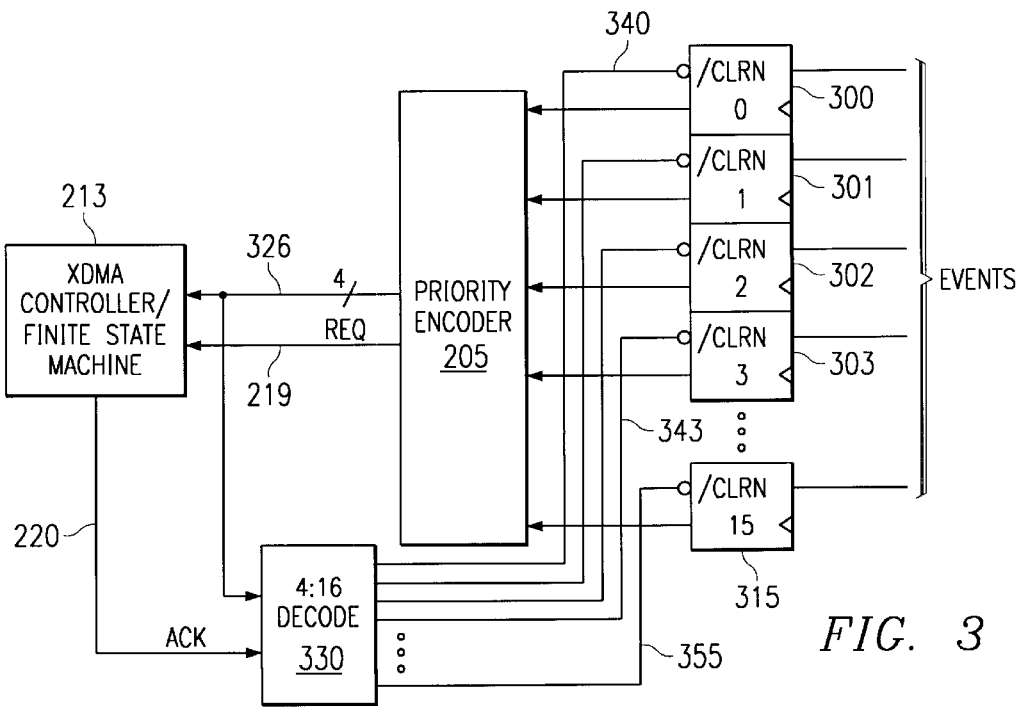

|  | 67 | 48 47 | 32 31 | 0 |
|---|---|---|---|---|
| TR PACKET WORD #1 | OPTIONS (BELOW) | ELEMENT INDEX | SRC ADDRESS | |

|  | 67 64 63 | 48 47 | 32 31 | 0 |
|---|---|---|---|---|
| TR PACKET WORD #2 | UNUSED \| LINE COUNT | ELEMENT COUNT | DST ADDRESS | |

|  | 67 65 | 64 63 | 61 60 | 59 58 | 57 | 56 55 | 54 | 53 52 | 48 |
|---|---|---|---|---|---|---|---|---|---|
| OPTIONS | PRI | REQ ID | ELSZ | 2DS | SRC DIR | 2DD | DST DIR | REPORT WORD | |

PRIORITY – PRIORITY LEVEL (000(URGENT) 001(HIGH) 010(LOW),
                ALL OTHERS ARE RESERVED
REQUESTER ID – ENCODED REQUESTER ID NUMBER
                000 – L2
                001 – HPI
                010 – XDMA
                OTHERS – RESERVED
ELEMENT SIZE – 00 – 32-BIT
                01 – 16-BIT
                10 – 8-BIT
                11 – RESERVED
SRC/DST DIR – 00 – FIXED ADDRESSING
                01 – NORMAL (LINEAR INCREMENT)
                10 – REVERSE (LINEAR DECREMENT)
                11 – INDEXED (+ ELEMENT INDEX)
2DS – 2-D SRC TRANSFER
2DD – 2-D DST TRANSFER
REPORT WORD – REPORT COMPLETION CODE WORD

EXTERNAL DIRECT MEMORY ACCESS PROCESSOR IMPLEMENTATION THAT INCLUDES A PLURALITY OF PRIORITY LEVELS STORED IN REQUEST QUEUE

This application claims priority under 35 USC §119(e)(1) of Provisional Application No. 60/144,572, filed Jul. 15, 1999 and Provisional Application No. 60/162,341, filed Oct. 29, 1999.

TECHNICAL FIELD OF THE INVENTION

The technical field of this invention is digital device functional blocks, used generally in the area of microprocessor design and more specifically in the area of digital signal processor devices.

BACKGROUND OF THE INVENTION

The transfer controller with hub and ports architecture (TCHP), which is the subject of U.S. patent application Ser. No. 09/543,870 filed Apr. 6, 2000, now U.S. Pat. No. 6,496,740, is referenced in this text and referred to as simply a centralized transaction processor (CTP). This centralized transaction processor is a significant basic improvement in data transfer techniques in complex digital systems. Along with many other features, the centralized transaction processor allows for uniform implementation of port interfaces at the periphery of such systems. Features of the centralized transaction processor are enhanced when combined with an advanced direct memory access (DMA) processor such as external direct memory access processor external direct memory access of this invention.

Centralized Transaction Processor

The centralized transaction processor functional blocks and their interconnection to the external direct memory access processor are illustrated in the high level diagram of FIG. 1. The centralized transaction processor implementation and feature set are for the most part independent of the external direct memory access, functionality. The centralized transaction processor is comprised of hub 100 and ports 111 through 115. It performs the following tasks:

(1) Receives transfer requests in the form of transfer request packets 103 from transfer requester nodes 116 which communicate with the transfer request bus 117; the external direct memory access processor is one of those transfer requesters;

(2) Places these requests in queue manager RAM 102 within the TCHP hub 100;

(3) Prioritizes them by placing them in one of several priority levels within the TCHP hub channel registers 120;

(4) Generates source (read) and destination (write) commands and data for output from the source pipeline 121 and destination pipeline 122;

(5) Broadcasts these source and destination commands and data to all ports 111–115;

(6) Receives read data, acknowledge/status information from ports through the data router 123;

(7) Generates new source (read) and destination (write) commands and data for output from the source pipeline 121 and destination pipeline 122 to the I/O subsystem 123.

SUMMARY OF THE INVENTION

The external direct memory access processor of the present invention performs a super-set of the functions of a conventional DMA. The external direct memory access of this invention also provides all the features of the most advanced DMA functions including a full complement of transfer types plus support for a large number of channels. In addition, the external direct memory access architecture is both scalable and flexible without adding significant hardware for increasing the number of channels or modes supported.

Functionally, the external direct memory access processor consists of three main parts. The first part is the event capture and prioritization logic which serves to handle input requests and channel management. The event capture and prioritization logic continuously monitors the incoming requests for N-channels of the external direct memory access. Additionally, it is responsible for responding to these requests by submitting transfer requests to the second portion of the processor, the external direct memory access controller.

External requests might include, but are not limited to, external interrupts routed directly to the external direct memory access processor, on-chip peripherals not serviced in real time by the CPU, and more intelligent mastering peripherals or host CPUs. Mastering peripherals are characterized by their the ability to actively control transaction processing.

The third portion of the external direct memory access processor is the parameter RAM. The parameter RAM is generically the storage facility for the external direct memory access parameters. Because many complex tasks are supported, a high density RAM is very important to the external direct memory access architecture.

The external direct memory access controller performs a superset of all the functions of a conventional DMA. In addition the architecture of the external direct memory access lends itself to a much more scalable and easily maintainable design. Feature enhancements such as new transfer types, or number of events supported, are far simpler to add to the external direct memory access architecture than to a conventional DMA.

BRIEF DESCRIPTION OF THE DRAWINGS

These and other aspects of this invention are illustrated in the drawings, in which:

FIG. 2 illustrates the XDMA architecture block diagram;

FIG. 3 illustrates the XDMA prioritization logic;

FIG. 5 illustrates the XDMA parameter options field;

FIG. 8 illustrates the CPU accessible XDMA control registers.

DETAILED DESCRIPTION OF PREFERRED EMBODIMENTS

This invention describes an implementation of an XDMA processor, as generically described in terms of its architecture in EXTERNAL DIRECT MEMORY ACCESS PROCESSOR INTERFACE TO CENTRALIZED TRANSACTION PROCESSOR U.S. patent application Ser. No. 09/603,332 filed Jun. 26, 2000, claiming priority from U.S.

Provisional Application Nos. 60/144,572 filed Jul. 15, 1999 and Ser. No. 60/167,441 filed Nov. 23, 1999. This specific implementation includes several optimizations and features ideally suited for a real-time digital signal processing (DSP) system. While not all of the extensive features of the subject XDMA processor are new to DMA engines, the unique implementation and optimizations make the XDMA processor unlike any previous DMA controller functions.

The XDMA processor is responsible for servicing events signaled over the event inputs. Service consists of submission of a set of request parameters referred to as a TR (transfer request) packet to an address generation unit. Note that the address generation unit and the performing of actual read and write transfers is not included in the XDMA processor itself. The XDMA processor provides only the scheduling and submission of transfers directly. This separation of event scheduling and actual service is one of the unique features of the XDMA architecture, and this allows many optimizations with respect to scalability and feature set to made in a simpler manner than the consolidation of these processing steps would provide.

Figure 1:
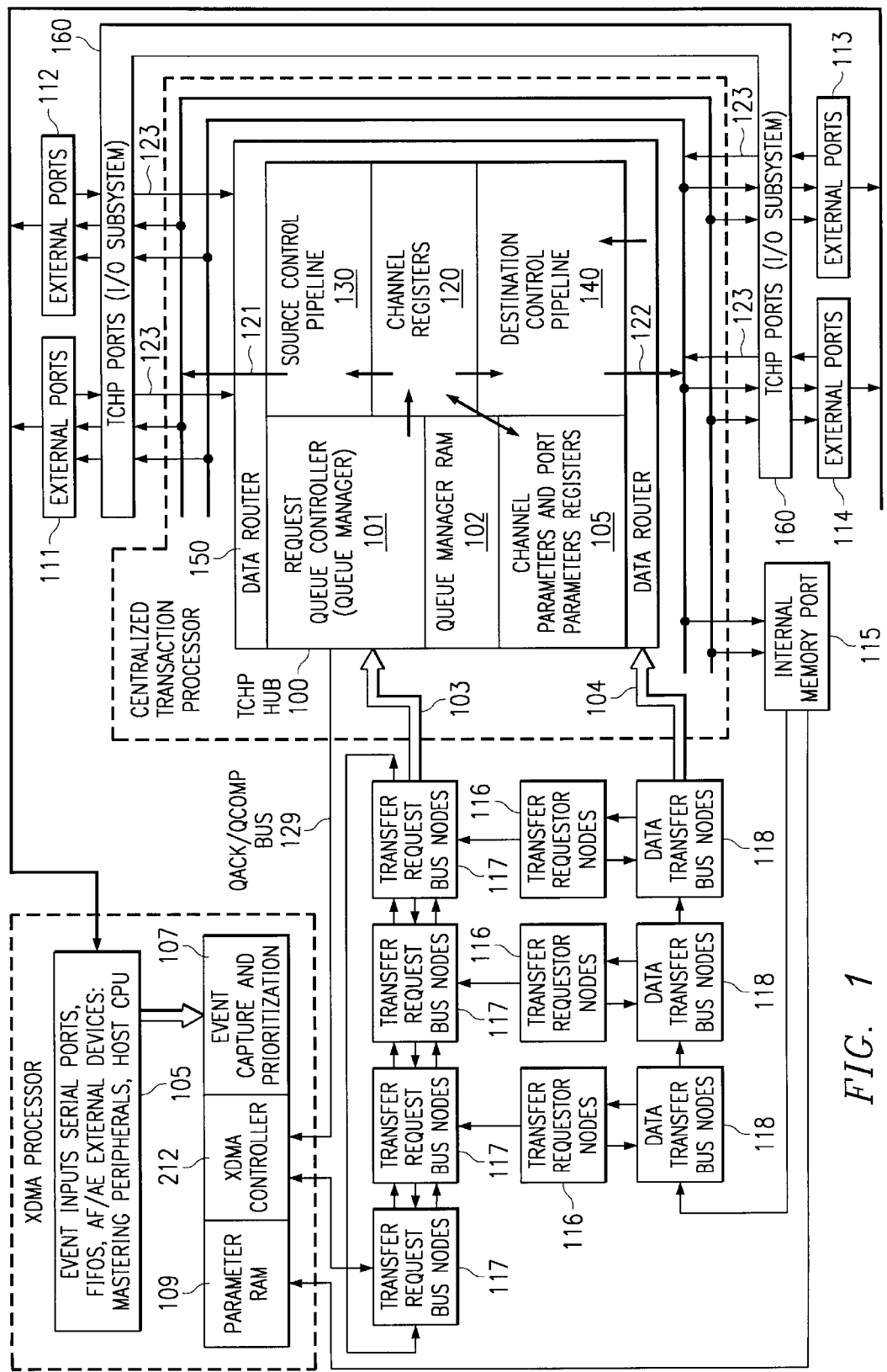
FIG. 1 illustrates the XDMA function included in an expanded DMA processor device.

Referring to FIG. 1, the XDMA processor consists of three main parts. The first part is the event capture and prioritization logic 107 which serves to handle input requests and channel management. This functional block continuously monitors the incoming requests for N-channels of the XDMA. Additionally, it is responsible for responding to these requests by prioritizing them and submitting transfer requests to the second portion of the processor, the XDMA controller 212.

The third portion of the XDMA processor is the parameter RAM 109. The parameter RAM is generically the storage facility for the XDMA parameters. Because many complex tasks are supported, a high density RAM is very important to the XDMA architecture.

The XDMA architecture illustrated in FIG. 2, generically consists of one or more banks of parameter storage, normally referred to as an XDMA parameter RAM 109, event capture and prioritization logic 107, and the XDMA controller 212. The event capture and prioritization logic includes the event register 204 and the priority encoder 205. The XDMA controller block is comprised of the finite state machine FSM 213 and the TR formatter 214.

The XDMA controller is responsible for servicing events signaled over the event inputs. Service consists of submission of a set of request parameters, referred to as a TR (transfer request) packet to an address generation unit. Note that the address generation unit and the performing of actual read and write transfers is not included in the XDMA controller itself. The XDMA controller provides only the scheduling and submission of transfers directly. This separation of event scheduling and actual service is one of the unique features of the XDMA architecture, and allows many optimizations with respect to scalability and feature set to made in a simpler manner than the consolidation of these processing steps would provide.

The specific XDMA controller design described here is a 16-event XDMA controller, ideally suited for processing real time data streams associated with DSP processing. A 2 K-byte parameter RAM is included, providing storage for many sets of transfer parameters. A simple set of 'processing rules' implemented in the control state machine provides many options in conventional DMA operations commonly used in DSP. The functional blocks into which the XDMA controller is partitioned will be described next.

Referring to FIG. 3, events are signaled to the XDMA controller via a low-to-high transition on one of the 16 XDMA event inputs 300 through 315. Often, polarity control is also provided for the event inputs via simple XOR gate within the XDMA controller. In the specific implementation of the preferred embodiment, however, the event inputs were shared with the device interrupt pins, so polarity control was provided outside of the XDMA controller.

The event input lines, 300 through 315, may have many sources within a system. Typical examples include serial port interrupts/data ready signals, external interrupts, timer interrupts, and other periodic peripheral signals which execute a transition when service is required. Each event is captured into a bit in the event register. This is required so as to allow the XDMA controller to capture system events while processing previously signaled events without failing to provide service to any of the events.

The event register outputs from event registers 300 through 315 feed directly to the priority encoder 205. Many prioritization schemes are possible. In the XDMA processor design of the present invention, a simple priority encoder was implemented. Through the priority encoder, the 16 captured events are reduced to a single event number, representing the highest priority event currently pending in the XDMA controller. It is noted however, that this prioritization logic does not define the priority of the XDMA service for the event. The prioritization logic is required only to deal with the cases of simultaneous events pending in the XDMA controller. The priority of the DMA service, as will be shown, is user programmable through the transfer parameters.

In the implementation of this invention, event line 315 has a higher priority than event line 314, which is higher than 313, and so on down to the lowest priority event, event line 300. Event lines at the higher priority end of the prioritization logic will have a higher chance of being serviced first. However, since the XDMA controller is responsible only for submitting transfer request packets TRP for the event, it is generally not loaded heavily.

As a consequence, the XDMA controller generally services events as soon as they are captured in the event register bits. However, in the case where two or more events come in together, or two or more come in while the XDMA is servicing another event, the priority encoder will assign a higher priority to one of the events, such that the controller sees only one event at a time.

The priority encoder outputs an N-bit event number with $2^N$=number of events and N=4 in the present controller design. In addition a valid bit is output indicating that the encoded event number is actually pending. The valid bit is generated via a simple non-zero detect of the event register. The valid bit serves as a request 'req' signal 219 to the XDMA controller block for service of the encoded DMA number. The controller outputs an acknowledge 'ack' signal 220 to the prioritization logic indicating that is has recognized the event and begun servicing it.

Upon acknowledging an event, the event register bit is cleared. Note that if a second event comes in on the same event line, it will again be captured in the event register, and prioritized accordingly. This allows events to be signaled to the XDMA controller even before a previously signaled event has been completely serviced. This pipelining of service and event capture significantly improves the throughput capabilities of an XDMA based system.

In FIG. 3, event registers 300 through 315 bring in the individual 16-bit captured event words. In the priority encoder 205, the 16 captured events are reduced to a single event number, representing the highest priority event currently pending in the XDMA controller. The selection of an event by the priority encoder results in a four-bit code 326 corresponding to that event. This code is decoded by the 4–16 line decoder 330, and upon having an ack signal 220 from the XDMA controller, the decoder outputs a clear signal, one of 340 through 355, applied to the event register of the event selected as highest priority. The XDMA controller 213 proceeds to direct processing of the selected, captured event.

Once the controller acknowledges an event, it is serviced to completion. That is, the priority encoder output is not evaluated again until the controller returns to an idle state, after complete service of the previous event that was prioritized. This simplification avoids the need for considering many boundary conditions, thus greatly reducing the design complexity and verification cost of the XDMA controller.

Figure 4:
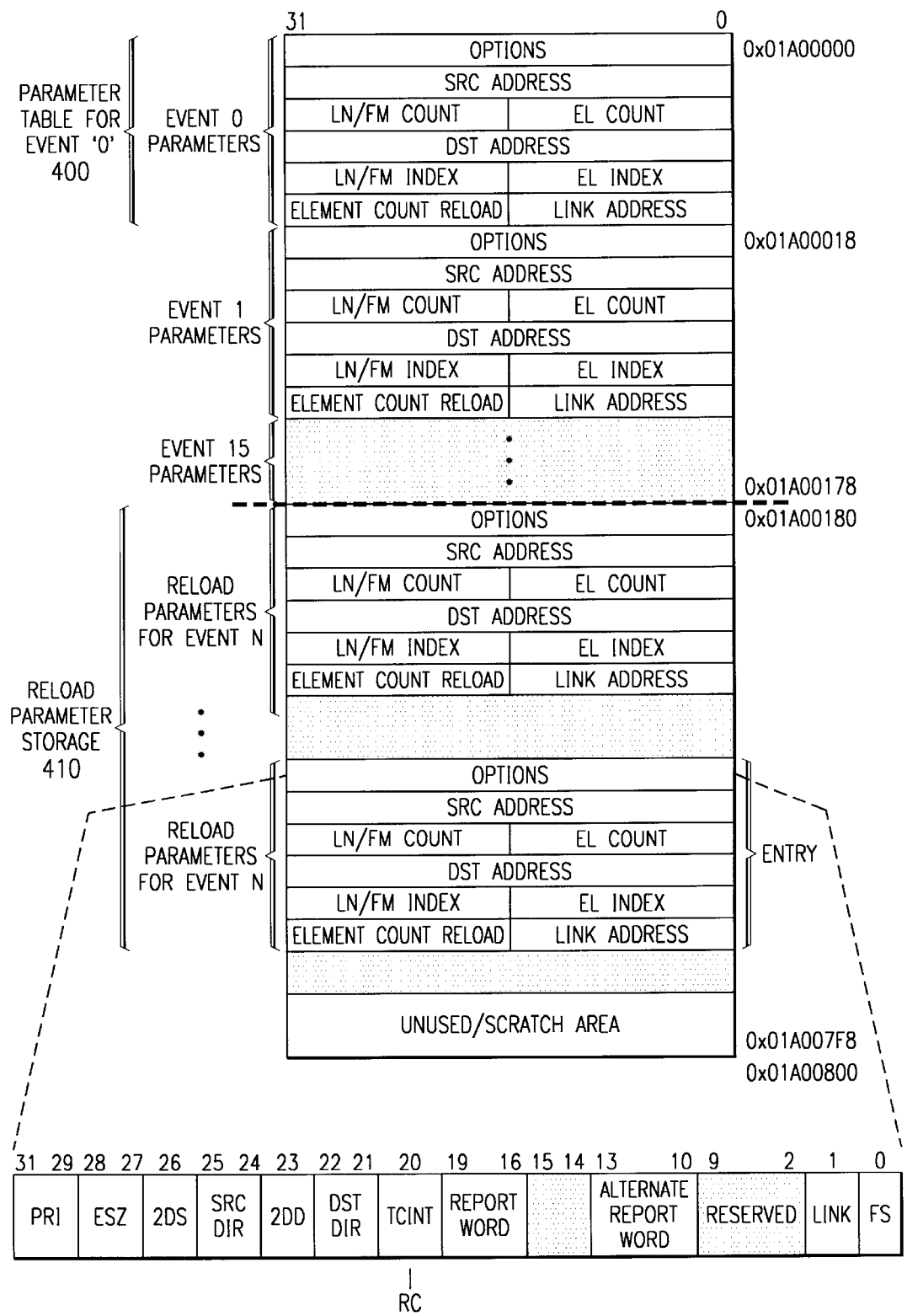
FIG. 4 illustrates the XDMA Parameter RAM.

Once an event is acknowledged, the XDMA controller 213 assumes control. Each event in the XDMA controller references a specific location in the XDMA parameter RAM. The structure of the XDMA parameter RAM is shown in FIG. 4. This RAM contains a parameter set, called parameter tables 400, for each of the 16 events, plus additional storage for reload parameters 410, which may be partitioned across the 16 events under complete user control. Each parameter table is a fixed size, 24 bytes in the design of the preferred embodiment. Thus, a 2 KB parameter RAM can store up to 85 parameter tables. The first 16 parameter table entries in the RAM correspond to the 16 events and therefore the 16 'active' sets of parameters in the immediate work area of the XDMA controller. The remaining 69 parameter table entries represent reload parameters to which the 16 base entries may be 'linked'. Linking is described later in the text.

The XDMA controller finite state machine, 213 in FIG. 2, can directly use the event number from the priority encoder to determine which entry in the parameter RAM to read. Because the event parameter tables are a fixed 24-byte size, the event number directly tells the XDMA controller from where to extract the event parameters. Specifically this is at byte offset 0×18 X event number. The finite state machine addresses the parameter RAM to read the transfer parameters. The number of RAM reads can vary for varied implementations. In the implementation of the preferred embodiment, three reads from a 64-bit width parameter RAM are required to extract the 24 bytes of parameter information.

The transfer parameter information stored in the XDMA parameter table likewise varies with implementation. In the preferred embodiment, the design uses the format shown in Table 1.

TABLE 1

| 31 | 16 | 15 | 0 |
|---|---|---|---|
| Options | | | |
| Source Address | | | |
| LN/FM Count | | Element Count | |
| Destination Address | | | |
| LN/FM Count | | Element Count | |
| Element Count Reload | | Link Address | |

The XDMA parameter table data resembles the TR packet closely. While this is not a strict requirement for XDMA designs, this optimization is a part of the preferred embodiment.

By storing the XDMA parameters in a similar format to the TR packet, registering of certain parameter field entries can be eliminated by simply forwarding the data to the TR bus upon submission. The TR bus Transfer Request Packet TRP uses the format illustrated in FIG. 5.

Once the transfer parameters are extracted from the RAM, the XDMA controller posts a request to the TR bus at the transfer request node to submit the transfer to the address generation unit. The address generation unit is, in the present embodiment, the transfer controller with hub and ports architecture, specifically the TCHP hub 100 of FIG. 1. The transfer parameters contain information about the source address, destination address, element count (where element may be byte, halfword (16-bit) or word (32-bit) entities), and addressing mode that the address generation unit should use to perform the transfer.

Some of the parameters sent to the address generation unit (TCHP pipelines 130 and 140 of FIG. 1 in the present application) are for that unit only, and some parameters are used by both the address generation logic and the XDMA logic. Still other stored XDMA parameters are used only by the XDMA itself, and are not passed to the address generation logic at all.

Once a request is accepted by the TR bus 117, the XDMA controller state machine 212 may write back parameter updates to the XDMA parameter RAM 109, depending on the transfer parameters that it just read for the event. A common update cycle is for performing address updates. For example, when an event is received, the XDMA sends a request to move a piece of data to a local buffer in memory.

Once that request is sent, the XDMA can update the source and/or destination address to set up the stored parameters for the next occurrence of the event. The address update can be an offset from the previous address value (indexed addressing) or read from a different location in the parameter RAM through linking (commonly referred to as ping-pong addressing).

Both the XDMA controller state machine and the address generation logic use portions of the parameter table options field. The following sections outline the functions of the parameter options field in the XDMA controller described here.

XDMA Parameter Options Field

PRI Field

The PRI field defines the priority with which the transfer will be processed by the address generation unit. It is noted that this is the true 'priority' of the transfer, in terms of the real time data transfer associated with DSP applications, rather than the aforementioned 'priority' assigned to events in the XDMA controller. The PRI bits, as all of the parameter bits, are programmable by the user as simple parameter RAM writes.

The PRI field is 3 bits wide (see FIG. 5, bits 65, 66, and 67 of the options field). This allows for up to 8 priority levels to be specified. In the implementation, of the preferred embodiment, only levels 001 and 010 are supported, as that is all that the address generation logic supports.

While the PRI field is used primarily by the address generation logic, it has a function in the XDMA controller itself. Because the XDMA controller only sequences events and sends transfers, it is possible that it could oversubscribe to the limited resource of the address generation logic.

To prevent this from occurring, the address generation logic and XDMA controller provide a feedback path, taking the form of a narrow bus with transfer 'acceptance' information contained in it. In the implementation of the preferred embodiment, the feedback bus is referred to as the QACK bus 129 (see FIG. 1), or queue acknowledge bus, which indicates that the address generation logic has successfully queued up a requested transfer. The return data sent from the address generation logic to the XDMA consists of the PRI level on which the transfer has been accepted. The address generation unit allows for up to 10 transfers to be outstanding (submitted, but not completed) on each of the two PRI levels allotted to the XDMA controller.

To prevent the XDMA from oversubscribing to the address generation unit, a set of counters, one for each PRI level supported, is included. Each counter is incremented when a TR packet was sent for that PRI level, and decremented for each return code on that PRI level on the occurrence of a QACK signal.

Because the address generation logic is shared across several requestors, the QACK bus 129 also includes a requester identification field. This is unimportant to the XDMA implementation, except to note that both the requester identification field and PRI level are evaluated by the XDMA controller. If a transfer is requested on a PRI level whose counter had reached a maximum, namely 10, the XDMA would stall and wait for a completion code to return on QACK bus 129, thus decrementing the counter and unstalling the machine.

For simplicity, the XDMA controller makes no provision for attempting to process a transfer on a PRI level that is not stalled while waiting to submit one which is stalled.

ESZ Field

The ESZ field (see FIG. 5, bits 59–60 of the options field) specifies the default element size, where element is the smallest addressable unit for the transfer. Element sizes of byte, halfword (16-bit) and word (32-bit) are supported by the controller design of the preferred embodiment. The element size bits are used by both the address generation logic as the transfer is processed, and also by the XDMA controller when performing address updates. Table 2 illustrates the possible selections of element size in the present implementation.

TABLE 2

| ESZ | Element Size |
|---|---|
| 00 | 32-bit (word) |
| 01 | 16-bit (half word) |
| 10 | 8-bit (byte) |
| 11 | Reserved |

SRC and DST DIR Bit Fields

The SRC DIR and DST DIR bit fields (see FIG. 5 bits 56–57 and 53–54 respectively) define how the address generation logic and XDMA controller should process the event parameters. The present design supports fixed mode addressing (all transfers to/from the same address), linear and decrement transfers, and indexed transfers (each element separated by an offset). The address mode may be specified independently for both source and destination.

The 2DS and 2DD bits (see FIG. 5 bits 58 and 55 respectively) define the dimensionality for the source and destination respectively. A logical '0' in these positions specify that single dimensional transfers are to be performed. A logical '1' indicates that multi-dimensionality is specified.

In addition to controlling the XDMA parameter updates, the SRC and DST DIR bits are also passed to the transfer request bus as they are used by the I/O system to perform the individual read and write accesses. For fixed mode transfers, all reads (SRC_DIR) and/or write (DST_DIR) are performed to the same source and/or destination address supplied by the XDMA controller. For linear and decrement transfers, the XDMA supplied SRC/DST address represents a starting address, from which subsequent accesses should be performed with an increasing or decreasing address computation. Indexed transfer mode allows an offset to be added to the source (specified by SRC_DIR) and/or destination (specified by DST_DIR) address after each element transfer. Both the source and destination parameters however must share a single index if element indexing is specified. FIG. 5 illustrates the element index bits of the transfer request packet word #1.

Multi-dimensionality allows an offset to be specified between 'lines' of a transfer, where a line is a number of elements. Note that this offset is separate from the indexing mode of addressing, where an offset is specified between each element. Element indexing and 2D transfers may be specified together, using separate indexes between elements and lines of elements.

The report word and alternate report word fields make use of the RC/ARC bits, (RC refers to report word complete and ARC refers to alternate report word complete) A logical '1' in RC/ARC means that the address generation logic should report the completion back to the XDMA controller once the last write is performed for the transfer. To keep the XDMA controller design independent of the system in which it is used, the method of reporting takes the form of a user programmable field, called the report word.

Two report word fields are provided. The transfer request packet TRP report word field is a four-bit code which the address generation logic will send back to the XDMA controller once a transfer is completed. Note that only one report word field is provided in the TR packet structure (see FIG. 5 bits 48–52).

The XDMA controller has the capability of sending either the report word, or alternate report word to the transfer request bus. The decision to submit the report word or alternate report word is determined by the transfer type and state of the transfer. The report words for transfers are fed back into the XDMA controller on a separate, narrow bus called QCOMP, or queue complete. The address generation logic drives the QCOMP bus with the report word sent with the TR packet for the transfer once the final write for the transfer has been completed. Note that this value could be either the report word or alternate report word stored in the XDMA parameters.

Use of Alternate Report Word to Alleviate Priority Level Hogging

The alternate report word can be used in several ways to improve system performance. A common issue to address at the system level is priority hogging and priority load balancing. While the XDMA controller can issue many requests in a short amount of time, the actual I/O engine, the EDMA in processing the XDMA requests will have a limited bandwidth, and a limited number of priority levels. Because transfers on each priority level are processed in order it is important that the user ensure that each priority level is not overburdened. That is, transfers on a low priority go in order with respect to other low priority transfers; high priority transfers go before lower priority transfers but behind other high priority transfers which started first. Thus, if a large transfer is submitted by the XDMA that requires so much time to process that other transfers on the same priority level are delayed, real time requirements of data delivery might not be met. This is highly undesirable, particularly in a DSP system.

Figure 6:
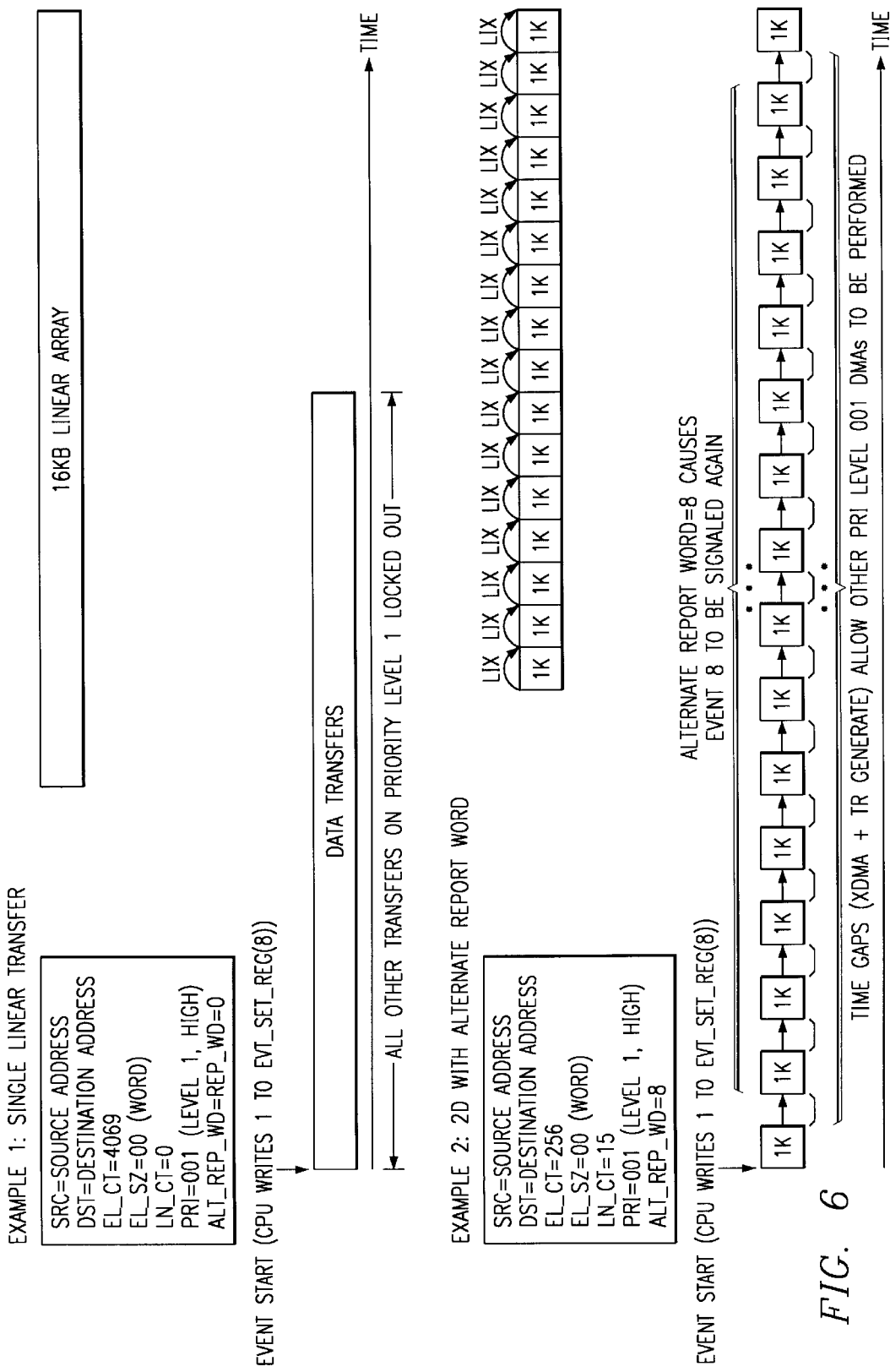
FIG. 6 illustrates using Alternate Report Word to i Alleviate Priority Level Hogging.

To address this, the XDMA user may utilize the alternate report word feature to 'break' a large transfer into numerous smaller transfers with timing gaps between them, such that other transfers on that priority level can 'slip into' the gaps. An example of this is shown in FIG. 6. In example 1, a large transfer of 16 KB is performed on priority level 1. If performed as shown (4K words=16 KB), the data transfer phase of the transfer will require an amount of time to perform. During this period, servicing all other transfers on priority level 1 is delayed. A solution to this issue is shown in example 2.

The XDMA parameters are instead set up to indicate that a 2D transfer is to be performed. This utilizes 16 lines of 1 KB each (again, 16 KB total), with the line index simply set to the element count times element size (effectively making the transfer 1-dimensional, thus performing the same transfer as in the first example). The alternate report word is specified in the second example, which will be sent back to the XDMA once a 1 KB line is completed. This report word will trigger the next 1 KB transfer through the aforementioned chaining mechanism. This continues for the remaining 14 1 KB blocks of the transfer, until the line count is exhausted (which will happen after the sixteenth event, so all 16 KB are transferred just as before). The advantage to this mechanism however is that 16 1 KB transfers are actually generated by the XDMA, and there are timing 'gaps' between each 1 KB block transfer. During these times, other transfers which may need to use priority level 1 can be processed. The net effect to the 16 KB transfer is that it takes slightly longer to finish, however, other transfers can be processed during the difference in time between the first and second example.

Use of Alternate Resort Word to Signal Multiple Events

Figure 7:
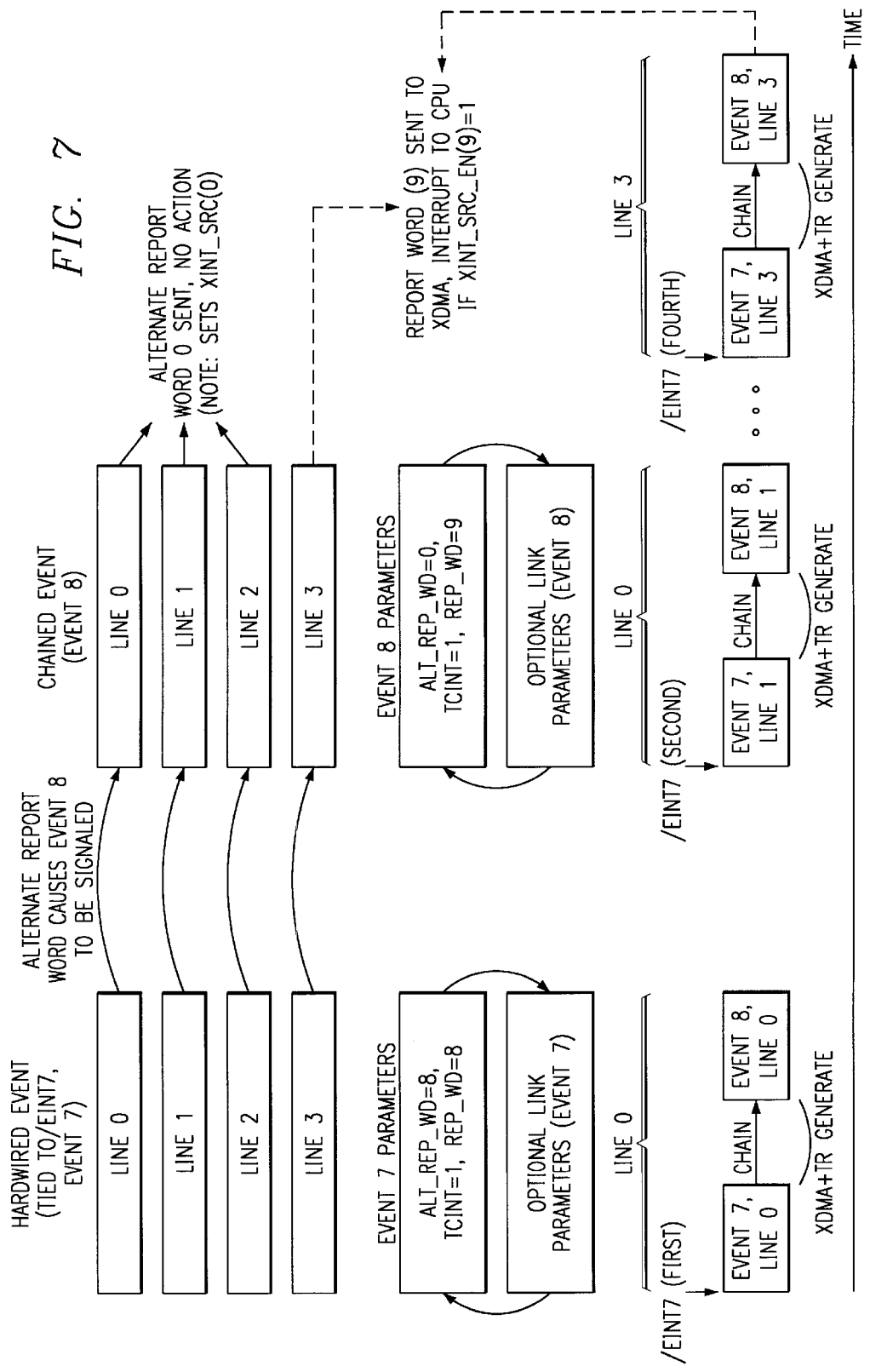
FIG. 7 illustrates using Alternate Report Word to Signal Multiple Events.

A second common use of the alternate report word is to allow a single event input to submit two or more transfers. This is often used as a device pin saving measure, whereby assertion of a single pin can be used to perform DMA operations not possible with a single DMA channel alone. An example of this is shown in FIG. 7.

In this example, an external interrupt pin (labeled EINT7) is tied to event 7 of the XDMA controller. When this pin is asserted, the XDMA controller latches this assertion in the EVT_REG, and the XDMA controller begins processing the event parameters (this would occur after the aforementioned step of even prioritization through the priority encoder).

The event 7 parameters as shown transfer a line of data, but also specify that report word 8 should be sent upon completion when this happens, event 8 is then signaled, and the XDMA processes that events' parameters (again through the priority encoder stage as described earlier). In the example shown, event 8's parameters respond in this manner such that each time a single assertion of EINT7 occurs, two events are actually signaled within the XDMA. Thus, the.XDMA has been used to perform multiple operations using only a single input pin. This example can be easily extrapolated to many more operations using the XDMA alternate report word mechanism.

The XDMA controller logic includes a set of parallel comparators to monitor the QACK bus 129. When a particular code is detected, the XDMA may signal another event (event 'chaining', where completion of one DMA initiates another) or an interrupt to the CPU, or both.

Link Bit and FS Bit

The final two bits of the XDMA parameter options field, the link bit and the FS bit, are used solely by the XDMA itself. A logical '1' in the link bit specifies that the XDMA should link the current parameters with a set of parameters pointed to by the link address field of the parameters upon exhaustion of the parameters. That is, once a set of parameters has been exhausted, the XDMA controller can autonomously read a parameter table from an area of the parameter RAM pointed to by the link address and write them back to the associated events default location (one of the top entries).

It is useful to define an operating condition, the 'point of parameter exhaustion' which is partly determined by the type of transfer that is being performed and the element and line counts associated with the current parameters. An additional condition should be noted at this point, namely, that logical '0' in the link bit disables parameter linking. These link conditions are defined in Table 3. Both the link conditions and the transfer type and line count mentioned above define the point of parameter exhaustion. The point of parameter exhaustion in turn is used to gate generation of the report word or alternate report word. These report word considerations are described in detail later in Tables 5 and 6.

TABLE 3

|  | Non-2D Transfers | 2D Transfers |
| --- | --- | --- |
| Read Sync/Write Sync (FS = 0) | Line Count = 0 AND Element Count = 1 Line Count = 0 | Line Count = 0 |
| Element Synchronized Frame Sync (FS = 1) Frame Synchronized |  | Always |

The FS bit determines whether or not the transfer is frame synchronized or element synchronized. A frame-synchronized transfer will transfer multiple elements per occurrence of the event that triggers the transfer. Depending on the transfer type, a complete line, or even complete frame may be transferred on a 2-D transfer if FS=1. FS=0 indicates that element synchronization is specified, and therefore only one element is transferred per event, or one line per event for a 2-D transfer.

This type of transfer is common with slow peripherals such as serial ports, which have only enough buffering for a couple of words before they require service. The FS bit, like the link bit, is separate from the other options bits in that it is never sent to the address generation logic. Both bits however are evaluated by the XDMA controller, and used to alter the processing of parameter updates by the XDMA controller.

The 2DS and 2DD bits work in conjunction with the FS bit to provide the various operations. Table 4 outlines the line counts and element counts that the XDMA controller will submit to the transfer request node.

When processing multi-dimensional or indexed transfers, the XDMA controller is responsible for performing certain parameter updates so as to track the state of the transfer. For example, if each event occurrence on a particular event line is to transfer one line of a frame, it is often desirable to update the source and/or destination addresses, and line count, parameters to set up the event for the next occurrence. This type of update is similar to linking in that parameters are written back to the XDMA parameter RAM from the XDMA controller rather than from the CPU. This feature provides the XDMA the capability to perform complex DMA transfers autonomously, thus reducing the CPU overhead.

TABLE 4

| Synchronization | Mode | Element Count sent to TR |
|---|---|---|
| FS = 0 | 2DS & 2DD = 0 | Parameters[Element Count] |
| FS = 0 | 2DS \| 2DD = 1 | Parameters[Element Count] |
| FS = 1 | 2DS & 2DD = 0 | Parameters[Element Count] |
| FS = 1 | 2DS \| 2DD = 1 | Parameters[Element Count] |

| Synchronization | Mode | Line Count sent to TR |
|---|---|---|
| FS = 0 | 2DS & 2DD = 0 | 0 |
| FS = 0 | 2DS \| 2DD = 1 | 0 |
| FS = 1 | 2DS & 2DD = 0 | 0 |
| FS = 1 | 2DS \| 2DD = 1 | Parameters[Line Count] |

| Source Dir | Destination Dir | Mode | Index sent to TR |
|---|---|---|---|
| 00 | 00 | 2DS \| 2DD = 0 | 0 |
| 00 | 00 | 2DS \| 2DD = 1 | Parameters[Line Index] |
| 00 | 01 | 2DS \| 2DD = 0 | 0 |
| 00 | 01 | 2DS \| 2DD = 1 | Parameters[Line Index] |
| 00 | 10 | 2DS \| 2DD = 0 | 0 |
| 00 | 10 | 2DS \| 2DD = 1 | Parameters[Line Index] |
| 00 | 11 | 2DS \| 2DD = 0 | Parameters[Element Index] |
| 00 | 11 | 2DS \| 2DD = 1 | Parameters[Element Index] |
| 01 | 00 | 2DS \| 2DD = 0 | 0 |
| 01 | 00 | 2DS \| 2DD = 1 | Parameters[Line Index] |
| 01 | 01 | 2DS \| 2DD = 0 | 0 |
| 01 | 01 | 2DS \| 2DD = 1 | Parameters[Line Index] |
| 01 | 10 | 2DS \| 2DD = 0 | 0 |
| 01 | 10 | 2DS \| 2DD = 1 | Parameters[Line Index] |
| 01 | 11 | 2DS \| 2DD = 0 | Parameters[Element Index] |
| 01 | 11 | 2DS \| 2DD = 1 | Parameters[Element Index] |
| 10 | 00 | 2DS \| 2DD = 0 | 0 |
| 10 | 00 | 2DS \| 2DD = 1 | Parameters[Line Index] |
| 10 | 01 | 2DS \| 2DD = 0 | 0 |
| 10 | 01 | 2DS \| 2DD = 1 | Parameters[Line Index] |
| 10 | 10 | 2DS \| 2DD = 0 | 0 |
| 10 | 10 | 2DS \| 2DD = 1 | Parameters[Line Index] |
| 10 | 11 | 2DS \| 2DD = 0 | Parameters[Element Index] |
| 10 | 11 | 2DS \| 2DD = 1 | Parameters[Element Index] |
| 11 | 00 | 2DS \| 2DD = 0 | 0 |
| 11 | 00 | 2DS \| 2DD = 1 | Parameters[Line Index] |
| 11 | 01 | 2DS \| 2DD = 0 | 0 |
| 11 | 01 | 2DS \| 2DD = 1 | Parameters[Line Index] |
| 11 | 10 | 2DS \| 2DD = 0 | 0 |
| 11 | 10 | 2DS \| 2DD = 1 | Parameters[Line Index] |
| 11 | 11 | 2DS \| 2DD = 0 | Parameters[Element Index] |
| 11 | 11 | 2DS \| 2DD = 1 | Parameters[Element Index] |

The parameter update cycles performed as a function of FS, 2DS, and 2DD and SRC DIR bit conditions and DSR DIR bit conditions are defined in Tables 5 and 6. In these figures EC denotes element count and LC denotes line count.

TABLE 5

| Sync | Mode 2DS, 2DD | SRC DIR 00 fixed | 01 linear | 10 reverse | 11 indexed |
|---|---|---|---|---|---|
| FS = 0 | 00 | None | if(EC == 0) {None} else {+1 (element)} | if(EC == 0) {None} else {−1 (element)} | if(EC == 0) {None} elseif (EC == 1) {+ line index} else {+ Element index} |
| | 01 | None | if(LC == 0) {None} else {+(EC<<ESZ)} | if(LC == 0) {None} else {−(EC<<ESZ)} | if(LC == 0) {None} else {+ Element Index} |
| | 10 | None | If(LC == 0) {None} else {+ Line Index} | If(LC == 0) {None} else {− Line Index} | if(LC == 0) {None} else {+ Element Index} |
| | 11 | None | If(LC == 0) {None} else {+ Line Index} | if(LC == 0) {None} else {+ Line Index} | if(LC == 0) {None} else {+ Element Index} |
| FS = 1 | 00 | None | if(LC == 0) {None} else {+(EC<<ESZ)} | if(LC == 0) {None} else {+(EC<<ESZ)} | if(LC == 0) {None} else {+ Line Index} |
| | 01 | None | None | None | None |
| | 10 | None | None | None | None |
| | 11 | None | None | None | None |

TABLE 6

| Sync | Mode 2DS, 2DD | DST DIR 00 fixed | 01 linear | 10 reverse | 11 indexed |
|---|---|---|---|---|---|
| FS = 0 | 00 | None | if(EC == 0) {None} else {+1 (element)} | if(EC == 0) {None} else {−1 (element)} | if(EC == 0) {None} elseif (EC == 1) {+ line index} else {+ Element index} |

TABLE 6-continued

| Sync | Mode 2DS, 2DD | DST DIR | | | |
|---|---|---|---|---|---|
| | | 00 fixed | 01 linear | 10 reverse | 11 indexed |
| | 01 | None | if(LC == 0) {None} else {+ Line Index} | if(LC == 0) {None} else {+ Line Index} | if(LC == 0) {None} else {+ Element Index} |
| | 10 | None | If(LC == 0) {None} else {+(EC<<ESZ)} | If(LC == 0) {None} else {-(EC<<ESZ)} | if(LC == 0) {None} else {+ Element Index} |
| | 11 | None | If(LC == 0) {None} else {+ Line Index} | If(LC == 0) {None} else {+ Line Index} | if(LC == 0) {None} else {+ Element Index} |
| FS = 1 | 00 | None | if(LC == 0) {None} else {+(EC<<ESZ)} | if(LC == 0) {None} else {+(EC<<ESZ)} | if(LC == 0) {None} else {+ Line Index} |
| | 01 | None | None | None | None |
| | 10 | None | None | None | None |
| | 11 | None | None | None | None |

The parameter element count EC and line count LC update cycles performed as a function of DIR and FS bit conditions are defined in Table 7.

TABLE 7

| Sync | Mode 2DS, 2DD | Element Count Update | Line Count Update |
|---|---|---|---|
| FS = 0 | 00 | if(EC == 0) {None} elseif(EC == 1) {reload *} else {-1} | if(LC == 0) {None} elseif(EC == 1*) {-1} else {None} |
| | 01 | None | if(LC == 0) {None} else {-1} |
| | 10 | None | if(LC == 0) {None} else {-1} |
| | 11 | None | if(LC == 0) {None} else {-1} |
| FS = 1 | 00 | None | if(LC == 0) {None} else {-1} |
| | 01 | None | None |
| | 10 | None | None |
| | 11 | None | None |

Figure 8:
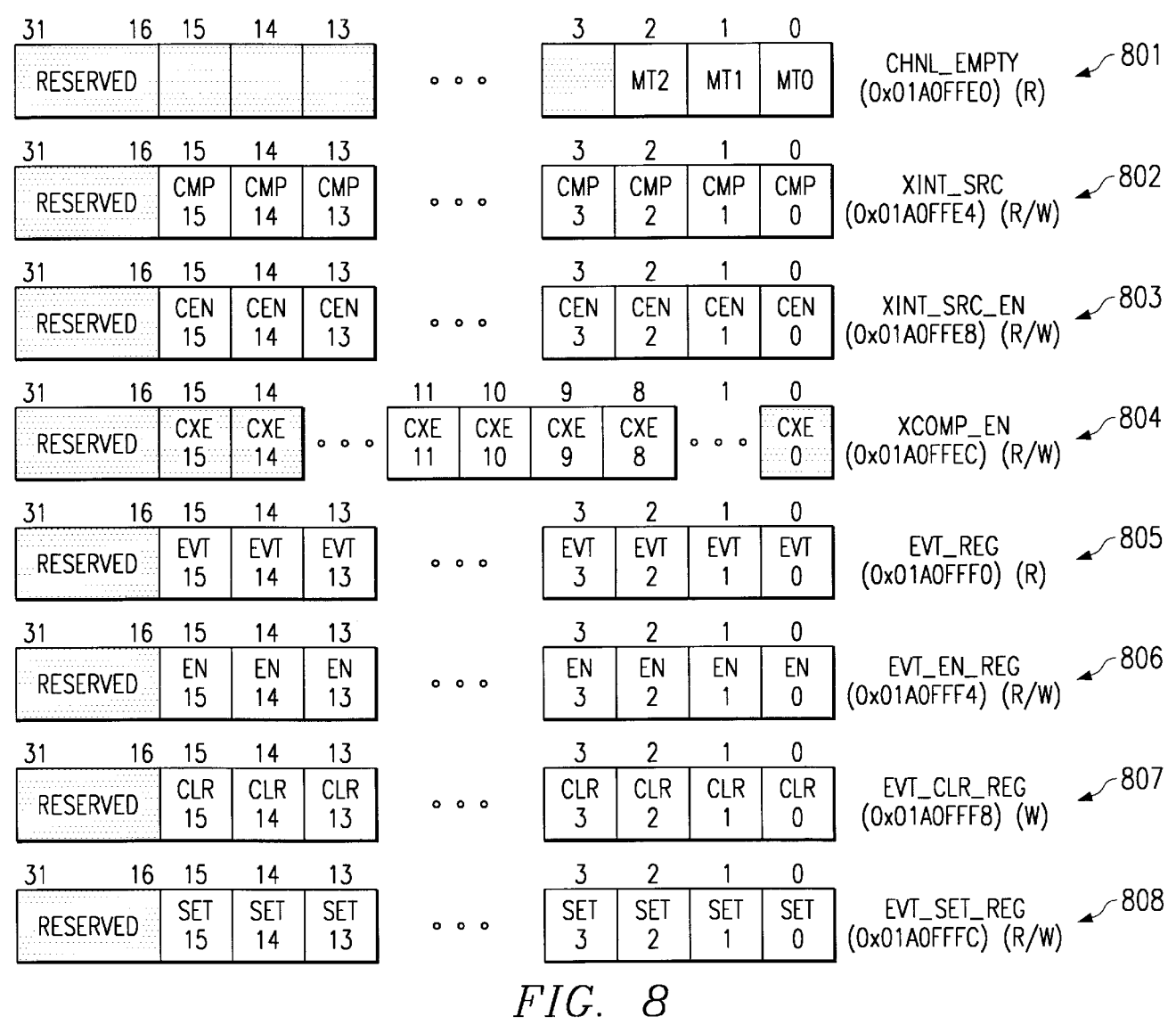

In addition to the finite state machine and parameter RAM, the XDMA of the present invention includes several registers which are CPU accessible to control the general actions of the XDMA controller. A pictorial view of the content of the registers of the XDMA controller is given in FIG. 8. The functions referred to by the signals on the right side of FIG. 8 will now be described.

CPU Capabilities

1. CPU can selectively enable and disable all events by writing to the EVT_EN_REG 806 (event enable register).

2. CPU can through the pseudo-register, EVT_CLR_REG 807 (event clear register) clear posted events. This feature is especially useful following a system reset, and in the case of a peripheral lockup or error condition.

3. Events posted to the XDMA controller are captured in the EVT_REG 805. The EVT REG contains one bit for each event, or a total of 16 bits.

4. Once set, the EVT_REG bits remain set until the XDMA controller FSM sends the TR packet for the event, or the CPU writes to the EVT_CLR_REG 807 with a logical '1' in the bit position corresponding to the event.

5. The CPU may directly set bits of EVT_REG by writing '1's to the corresponding bits of EVT_SET_REG 808. This feature provides the CPU the ability to submit DMAs in the system, and is also a valuable debug tool. The event need not be enabled in this case.

6. A posted event in EVT_REG must be enabled through the EVT_EN_REG 806 to be passed onto the priority encoder and serviced by the XDMA controller. The EVT_EN_REG contains 1 bit for each event; a 1 in EVT_EN_REG enables the corresponding event; a 0 disables the event. All bits in EVT_EN_REG must be cleared by a system (chip) reset to prevent spurious events from being serviced. Disabled events are still captured in EVT_REG.

7. In addition to the event and interrupt capture and enable registers, the XDMA controller includes a register accessible to the user to map several signals from the I/O subsystem for the purposes of status reporting. Separate signals from each of the I/O subsystem processing channels are provided. In the implementation of the preferred embodiment, three signals correspond to the three processing channels. A logical '1' on each signal indicates that the appropriate channel is not busy, and has no outstanding requests from the XDMA controller or any other system requester. A logical '0' indicates that the channel is busy, or has other pending transaction to perform. This type of information is useful to an operating system or task scheduler to find opportune times to perform a task switch.

What is claimed is:

1. An external direct memory access unit comprising:
   an event recognizer adapted to recognize one external event of a plurality of event types, said event recognizer including an event register including a bit corresponding to each event type set upon receipt of an external event of said corresponding type;

a priority encoder connected to said event recognizer selecting for service one recognized external event based upon priority assigned to each event type, said priority encoder resetting said corresponding bit of said event register upon selection of an external event;

a parameter memory storing direct memory access request parameters corresponding to each event type at corresponding addresses, each of said direct memory access request parameters stored in said parameter memory include a priority for centralized transaction processor independent of said priority of said event recognizer for said corresponding event type; and an external direct memory access controller connected to said priority encoder and said parameter memory recalling service request parameters from said predetermined address in said parameter memory corresponding to said recognized event and submitting said recalled direct memory access request parameters to a centralized direct memory access unit, said centralized direct memory access unit including a request queue for each of a plurality of priority levels storing received and not yet executing direct memory access requests, said centralized direct memory access unit returning a queue acknowledge signal to said external direct memory access controller upon acceptance of a direct memory access request and a stall signal if said request queue of the corresponding priority level is full.

2. The external direct memory access unit of claim 1, wherein:

said direct memory access parameters for each event type include an indication of a source address and a destination address for a data transfer; and said external direct memory access controller further coupled to said parameter memory to update at least one of said indication of source address and said indication of destination address for a next occurrence of an external event of said event type.

3. The external direct memory access unit of claim 2, wherein:

said external direct memory access controller updates said at least one of said indication of said source address and said indication of said destination address by adding an offset to a current address.

4. The external direct memory access unit of claim 2, wherein:

at least one of said direct memory access parameters stored in said parameter memory includes an address pointer to a linked list of additional service.request parameters; and said external direct memory access controller updates said at least one of said indication of said source address and said indication of said destination address by storing a new address pointer in said parameter memory.

5. A external direct memory access unit comprising:

an event recognizer adapted to recognize one external event of a plurality of event types, said event recognizer including an event register including a bit corresponding to each event type set upon receipt of an external event of said corresponding type;

a priority encoder connected to said event recognizer selecting for service one recognized external event based upon priority assigned to each event type, said priority encoder resetting said corresponding bit of said event register upon selection of an external event;

a parameter memory storing direct memory access request parameters corresponding to each event type at corresponding addresses, said direct memory access parameters stored in said parameter memory including a report word or an alternate report word for each event type;

an external direct memory access controller connected to said priority encoder and said parameter memory recalling service request parameters from said predetermined address in said parameter memory corresponding to said recognized event and submitting said recalled direct memory access request parameters to a centralized direct memory access unit; and said centralized direct memory access unit
performs a data transfer without permitting interruption if said direct memory access parameters includes said report word, and
performs a data transfer while permitting interruption at predetermined intervals if said direct memory access parameters includes said alternate report word.

6. A external direct memory access unit comprising:

an event recognizer adapted to recognize one external event of a plurality of event types, said event recognizer including an event register including a bit corresponding to each event type set upon receipt of an external event of said corresponding type, said event recognizer including an event mask having one bit corresponding to each event type, said event recognizer enabled to recognize an external event of an event type if said corresponding bit of said event mask has a first digital state and disabled from recognizing an external event of an event type if said corresponding bit of said event mask has a second digital state opposite to said first digital state;

a priority encoder connected to said event recognizer selecting for service one recognized external event based upon priority assigned to each event type, said priority encoder resetting said corresponding bit of said event register upon selection of an external event;

a parameter memory storing direct memory access request parameters corresponding to each event type at corresponding addresses; and an external direct memory access controller connected to said priority encoder and said parameter memory recalling service request parameters from said predetermined address in said parameter memory corresponding to said recognized event and submitting said recalled direct memory access request parameters to a centralized direct memory access unit.

7. The external direct memory access unit of claim 1, further comprising:

a central processing unit connected to said event recognizer capable of signaling an external event to said event recognizer.

8. The external direct memory access unit of claim 7, wherein:

said central processing unit signals an external event by a write to a bit of said event register.

9. The external direct memory access unit of claim 5, wherein:

said direct memory access parameters for each event type include an indication of a source address and a destination address for a data transfer; and said external direct memory access controller further coupled to said parameter memory to update at least one of said indication of source address and said indication of destination address for a next occurrence of an external event of said event type.

10. The external direct memory access unit of claim 9, wherein:
said external direct memory access controller updates said at least one of said indication of said source address and said indication of said destination address by adding an offset to a current address.

11. The external direct memory access unit of claim 9, wherein:
at least one of said direct memory access parameters stored in said parameter memory includes an address pointer to a linked list of additional service request parameters; and
said external direct memory access controller updates said at least one of said indication of said source address and said indication of said destination address by storing a new address pointer in said parameter memory.

12. The external direct memory access unit of claim 5, further comprising:
a central processing unit connected to said event recognizer capable of signaling an external event to said event recognizer.

13. The external direct memory access unit of claim 12, wherein:
said central processing unit signals an external event by a write to a bit of said event register.

14. The external direct memory access unit of claim 6, wherein:
said direct memory access parameters for each event type include an indication of a source address and a destination address for a data transfer; and
said external direct memory access controller further coupled to said parameter memory to update at least one of said indication of source address and said indication of destination address for a next occurrence of an external event of said event type.

15. The external direct memory access unit of claim 14, wherein:
said external direct memory access controller updates said at least one of said indication of said source address and said indication of said destination address by adding an offset to a current address.

16. The external direct memory access unit of claim 14, wherein:
at least one of said direct memory access parameters stored in said parameter memory includes an address pointer to a linked list of additional service request parameters; and
said external direct memory access controller updates said at least one of said indication of said source address and said indication of said destination address by storing a new address pointer in said parameter memory.

17. The external direct memory access unit of claim 6, further comprising:
a central processing unit connected to said event recognizer capable of signaling an external event to said event recognizer.

18. The external direct memory access unit of claim 17, wherein:
said central processing unit signals an external event by a write to a bit of said event register.

* * * * *

UNITED STATES PATENT AND TRADEMARK OFFICE
CERTIFICATE OF CORRECTION

PATENT NO. : 6,574,683 B1  
DATED : June 3, 2003  
INVENTOR(S) : David A. Comisky et al.

Page 1 of 1

It is certified that error appears in the above-identified patent and that said Letters Patent is hereby corrected as shown below:

<u>Title page,</u>
Item [75], Inventors, should read -- David A. Comisky, Plano, TX (US); Sanjive Agarwala, Richardson, TX (US) --

Signed and Sealed this

Twenty-third Day of March, 2004

JON W. DUDAS
*Acting Director of the United States Patent and Trademark Office*